United States Patent
Guadagno et al.

(10) Patent No.: US 8,481,615 B2
(45) Date of Patent: Jul. 9, 2013

(54) PROCESS FOR PREPARING SELF-HEALING COMPOSITE MATERIALS OF HIGH EFFICIENCY FOR STRUCTURAL APPLICATIONS

(75) Inventors: Liberata Guadagno, Fisciano (IT); Marialuigia Raimondo, Eboli (IT); Carlo Naddeo, Pontecagnano Faiano (IT); Annaluisa Mariconda, Baronissi (IT); Raffaele Corvino, Siano (IT); Pasquale Longo, Capaccio (IT); Vittoria Vittoria, Napoli (IT); Salvatore Russo, Quarto (IT); Generoso Iannuzzo, Avellino (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 257 days.

(21) Appl. No.: 12/944,608

(22) Filed: Nov. 11, 2010

(65) Prior Publication Data
US 2011/0118385 A1 May 19, 2011

(30) Foreign Application Priority Data
Nov. 13, 2009 (IT) .............................. TO2009A0870

(51) Int. Cl.
- *C08G 59/50* (2006.01)
- *C08G 59/22* (2006.01)
- *C08G 59/32* (2006.01)
- *B32B 27/38* (2006.01)
- *B32B 33/00* (2006.01)

(52) U.S. Cl.
USPC .......................................... 523/400; 525/529

(58) Field of Classification Search
USPC ............................ 523/400; 525/529; 428/413
See application file for complete search history.

(56) References Cited

U.S. PATENT DOCUMENTS
| | | | |
|---|---|---|---|
| 6,518,330 B2 | 2/2003 | White et al. | |
| 2007/0087198 A1* | 4/2007 | Dry | 428/408 |
| 2010/0168280 A1* | 7/2010 | Guadagno et al. | 523/464 |

FOREIGN PATENT DOCUMENTS
| | | |
|---|---|---|
| EP | 2 172 518 A1 | 4/2010 |
| WO | WO 02/064653 A2 | 8/2002 |
| WO | WO 2007/005657 A2 | 1/2007 |
| WO | WO 2009/113025 A1 | 9/2009 |

OTHER PUBLICATIONS

Kessler, M. et al. "Self-healing structural composite materials", Composites Part A: Applied Science and Manufacturing, vol. 34, No. 8, Aug. 1, 2003, pp. 743-753.
Brown, E. et al. "In situ poly(urea-formaldehyde) microencapsulation of dicyclopentadiene", Journal of Microencapsulation, vol. 20, No. 6, Nov.-Dec. 2003, pp. 719-730.
Wilson, G. et al. "Supporting Information: Evaluation of Ruthenium Catalysts for Ring Opening Metathesis Polymerization-Based Self-Healing Applications", Chem. Mater., vol. 20, 2008, pp. 3288-3297.
Dry, C. et al. "A comparison of bending strength between adhesive and steel reinforced concrete with steel only reinforced concrete", Cement and Concrete Research, vol. 33, 2003, pp. 1723-1727.
Dry, C. et al. "Procedures developed for self-repair of polymer matrix composite materials", Composite Structures, vol. 35, 1996, pp. 263-269.
Dry, C. et al. "Passive smart self-repair in polymer matrix composite materials", Proc. SPIE, vol. 1916, 1993, pp. 438. Abstract Only.
Dry, C. et al. "A novel method to detect crack location and volume in opaque and semi-opaque brittle materials", Smart Mater. Struct., vol. 6, 1997, pp. 35-39.
Toohey, K. et al. "Characterization of Microvascular-Based Self-Healing Coatings", Experimental Mechanics, vol. 49, 2009, pp. 707-717.
Toohey, K. "Microvascular networks for continuous self-healing materials", University of Illinois at Urbana-Champaign, 2007, thesis. Abstract Only.
Toohey, K. et al. "Self-healing materials with microvascular networks", Nature Materials, vol. 6, Aug. 2007, pp. 581-585.

* cited by examiner

*Primary Examiner* — Michael J Feely
(74) *Attorney, Agent, or Firm* — Merchant & Gould P.C.

(57) ABSTRACT

A process is for preparing a self-healing composite material including a matrix of epoxy polymer in which a catalyst of ring opening metathesis reaction and vessels containing at least one monomer able to polymerize due to a ring opening metathesis reaction are dispersed. The process includes the preliminary step of dispersing at molecular level the catalyst in a mixture containing at least one precursor of the epoxy polymer, and then the steps of dispersing, in the mixture, the vessels and a tertiary amine acting as curing agent of the precursor, and the step of curing the mixture by at least a first heating stage performed at a temperature between 70 and 90° C. for a time between 1 and 5 hours, and a second heating stage performed at a temperature between 90 and 170° C. for a time between 2 and 3 hours.

9 Claims, 7 Drawing Sheets

PROCESS FOR PREPARING SELF-HEALING COMPOSITE MATERIALS OF HIGH EFFICIENCY FOR STRUCTURAL APPLICATIONS

This application claims benefit of Serial No. TO2009A000870, filed 13 Nov. 2009 in Italy and which application is incorporated herein by reference. To the extent appropriate, a claim of priority is made to each of the above disclosed applications.

BACKGROUND OF THE INVENTION

The present invention relates to the field of thermosetting polymers and polymer composites with structural function.

These materials are used in many different applications, including transport vehicles (aircraft, spacecraft, boats, ships, cars, etc.), electronic components (for professional, civil, industrial and hobby use), sports articles, etc. Moreover, in service, they are subject to damage attributable to the formation of microcracks that are produced in the structure under the action of various kinds of stresses, for example: a) mechanical vibrations or various types of mechanical stresses, b) sudden temperature changes, c) irradiation by high-energy radiation causing direct or indirect rupture of chemical bonds (UV light, $\gamma$ rays, etc.), d) intentional or inadvertent contact with chemical substances that adversely affect the structure, e) various factors which in combination can contribute to compromising the integrity of the structure.

To reduce the damage caused by the various stresses and thus increase the useful life, safety and reliability of these materials, various systems have been proposed and developed for making them able to initiate self-healing processes that are activated by the actual onset of the microcracks, as stated for example in patent documents U.S. Pat. No. 6,518,330 and WO-2009/113 025. As described in those documents, powders of a catalyst of ring opening metathesis reaction, and microcapsules containing a reactive monomer that can polymerize following a ring opening metathesis reaction and then undergo crosslinking, are dispersed in the matrix of the polymer material. Therefore, when a crack that forms in said material reaches a microcapsule, it breaks it, causing the monomer to be released. The latter, coming in contact with the catalyst, is polymerized and then crosslinked, thus stopping the crack and restoring the structural continuity of the matrix. A field of choice for the use of these materials is that of structural aeronautical components.

For preparation of the matrix of these composite materials, a precursor of the thermosetting polymer is mixed with a curing agent and is reacted at elevated temperatures, to obtain the matrix of thermosetting polymer. These mixtures also already contain the microcapsules containing the reactive monomer and the solid particles of metathesis catalyst, to remain embedded in the matrix formed so as to provide, if the need subsequently arises when the material is in use, the self-healing function mentioned above.

According to the prior art, the catalyst for the metathesis reaction is embedded in the precursors of the polymer matrix in the form of solid particles, i.e. powders with varying morphology and crystallographic modifications (cf. "Supporting Information", G. O. Wilson, M. M. Caruso, N. T. Reimer, S. R. White, N. R. Sottos, J. S. Moore. *Chem. Mater.*, 2008, 20, 3288-3297).

In practice, the effective concentration of the catalyst depends on the availability of the aforesaid particles at the level of the fracture and on the rate of dissolution of the catalyst in the reactive monomer within the polymer matrix. Even with high concentrations of particles of catalyst exposed at the level of the fracture, the effective concentration of the catalyst could be relatively low because of limited rates of dissolution of the catalyst. The rate of dissolution of the catalyst depends not only on the chemical nature of the various components, but also on morphological and structural characteristics of the catalyst, for example the local availability, dimensions and crystallographic modification of the particles.

Overall, therefore, it has been found in practice that the presence of the catalyst in the form of crystalline powders has some critical aspects relating to the uniform availability of the catalyst in all the zones in which a microcrack can potentially develop, compromising the effectiveness of the self-healing process.

SUMMARY OF THE INVENTION

The purpose of the present invention is therefore to provide a process for the preparation of a self-healing composite material, which does not have the drawbacks mentioned above.

This purpose is achieved by a process for the preparation of a self-healing composite material comprising a matrix of epoxy polymer, in which a catalyst of ring opening metathesis reaction and vessels containing at least one monomer able to polymerize due to a ring opening metathesis reaction are dispersed, said process comprising the preliminary step of dispersing at molecular level said catalyst in a mixture containing at least one precursor of said epoxy polymer, and then the steps of:
 dispersing in the mixture said vessels and a curing agent for said precursor, which agent is chosen from the group consisting of tertiary amines, and
 curing said mixture by at least a first heating stage performed at a temperature between 70 and 90° C. for a duration between 1 and 5 hours, and a second heating stage performed at a temperature between 90 and 170° C. for a duration between 2 and 3 hours.

The term "vessel" means, in the present description, any container that is able to contain the reactive monomer, for example microcapsules of various dimensions, of spherical and/or ellipsoidal shape, or hollow capillaries of glass or other material, as suggested in C. Dry, M. Corsaw, Cem. Conc. Res., 2003, 33, 1723, C. Dry, Int. Patent 2007/005657 2007, C. Dry, Comp. Struct. 1996, 35, 263, C. Dry, N. Sottos, Proc. SPIE, Vol. 1916, 438, (1993), and C. Dry, W. Mcmillan, Smart Mater. Struct. 1997, 6, 35, as well as microchannels created during the curing step, such as proposed in K. S. Toohey, N. R. Sottos, S. R. White, *Exp. Mech.* 2009, 49, 707, K. S. Toohey, PhD. Thesis, University of Illinois at Urbana-Champaign 2007 and K. S. Toohey, N. R. Sottos, J. A. Lewis, J. S. Moore, S. R. White, R. Scott, *Nature Materials* 2007, 6, 581.

According to the process of the invention, the catalyst is dispersed in the polymer matrix at molecular level with a substantially uniform distribution, which disregards its particular crystallographic modification and its morphological parameters and does not compromise its activity. Consequently, its efficacy will be optimum when it comes in contact with the reactive monomer(s) during the self-healing processes, and will thus be able to be used in comparatively reduced amounts.

In principle, it is possible to use any precursor of epoxy polymer, for example diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4-epoxycyclohexylmethyl-3,4-epoxycyclohexane carboxylate and mixtures thereof.

The precursor of the epoxy polymer can moreover have one or more reactive diluents and/or flexibilizers added, in an amount preferably between 5 and 40 parts by weight per 100 parts by weight of precursor. Said reactive diluents and flexibilizers are preferably esters or ethers having an aliphatic chain comprising at least 7 carbon atoms and at least one oxirane ring, for example glycidyl esters, alkylglycidyl ethers, 1,4-butanediol diglycidyl ether, octyl-, decyl-, glycidyl ethers and mixtures thereof.

The precursor of the epoxy polymer can also have a toughening additive added: for example hyper-branched polymers that do not cause increases in viscosity of the epoxy polymer, which promote mixing and make it suitable for injection or for aspiration as envisaged by the VAR™ technology. If consistent toughening effects are required, low molecular weight aromatic polymers capable of producing phenomena of phase separation and hence efficient toughening of the matrix, can be added to the precursor.

The epoxy matrix can moreover comprise carbon fibres or carbon nanotubes in an amount between 0.1 and 3.0 parts by weight per 100 parts of matrix.

The precursor curing agent is chosen from the group consisting of the tertiary amines, for example 2,4,6-tris(dimethylaminomethyl)phenol, triethylene diamine, N,N-dimethylpiperidine, benzyldimethylamine, 2-(dimethylaminomethyl)phenol and mixtures thereof.

In the process of the invention it is possible in general to use Grubbs catalysts of first and second generation, as well as Hoveyda-Grubbs catalysts of first and second generation. Specific examples of said catalysts are benzylidenebis(tricyclohexylphosphine)dichloro-ruthenium (G1); 1,3-bis(2,4,6-trimethylphenyl)-2-imidazolidinylidene)(dichlorophenylmethylene)(tri-cyclohexylphosphine)ruthenium (G2); dichloro(o-isopropoxyphenylmethylene)(tricyclohexylphosphine)-ruthenium (HG1); (1,3-bis(2,4,6-trimethylphenyl)-2-imidazolidinylidene)dichloro(o-isopropoxyphenylmethylene)ruthenium (HG2), which have the following structural formulae:

G1

G2

HG1

HG2

Other examples of Hoveyda-Grubbs catalysts of second generation have the following structural formula:

in which Ar=aryl having at least one halogen or alkyl substituent and "R=alkyl with from 1 to 20 carbon atoms.

Preferably, the Ars are mesityl and/or "R is isopropyl. We may specifically mention 1,3-dimesityl-imidazolin-2-ylidene-ortho-methoxyphenylmethylene-ruthenium dichloride and 1,3-di(ortho-isopropylphenyl)imidazolin-2-ylidene-ortho-methoxyphenylmethylene-ruthenium dichloride.

The catalyst can be chosen on the basis of various considerations, for example:
 I) the lowest temperature value at which the self-healing function must be activated,
 II) the highest temperature value at which curing of the precursor must take place.

In case I), if in the composite material the mechanisms of self-healing must be activated at temperatures of less than or equal to −40° C., it is appropriate to use the Hoveyda-Grubbs catalysts, while 5-ethylidene-2-norbornene (ENB), and—even more advantageously—a mixture of ENB with dicyclopentadiene (DCPD), for example ENB/DCPD mixtures with concentrations of DCPD between 1 and 15%, and in particular between 4 and 7%, by weight, can be used advantageously as reactive monomer.

Use of a mixture of ENB with low concentrations of DCPD can greatly increase the degree of crosslinking of the metathesis product especially at extremely low temperatures. For example, by carrying out the ring opening metathesis reaction of an ENB/DCPD mixture (at 5% of DCPD) in the molar ratio 1:1000 (Hoveyda-Grubbs 1 catalyst/monomer) at a temperature of −53° C., the degree of crosslinking is found to be 57% (with a degree of conversion of 84%) after a reaction time of 7 hours. In similar conditions, the degree of crosslinking of ENB on its own is 10% with a degree of conversion of 100%.

The degree of crosslinking of the metathesis product obtained from the mixture of ENB/DCPD monomers (in particular at 5% of DCPD) increases rapidly when the metathesis product obtained at −53° C. is brought to room temperature. In particular, it reaches a value of 81% after a dwell time of 24 hours at room temperature (which is almost equal to the value of the degree of crosslinking of 87%, obtained on carrying out the metathesis reaction directly at room temperature). It should be pointed out that with said mixture it is possible to reach an optimum compromise between reaction rate, yield and degree of crosslinking of the metathesis product that forms at a temperature of −53° C.

In case II), for high curing temperatures, for example 170° C., it is advantageous to use a Hoveyda-Grubbs catalyst of first generation (HG1).

In the process of the invention, the preliminary step of dispersion of the catalyst at molecular level is preferably carried out by means of a treatment of mechanical mixing at temperatures between 50 and 100° C., in particular at 90° C.

During this preliminary step, continuous monitoring that the activity of the catalyst remains unchanged is desirable. An effective and accurate method for said monitoring is described in detail in example 1 given hereunder.

Carrying out the curing process in several stages at increasing temperature makes it possible to avoid deactivation of the catalyst. In fact, choosing a relatively low temperature in the first stage means that only the curing agent, and not the catalyst, reacts with the oxirane rings of the epoxy precursor. Therefore, the catalyst remains intact in the epoxy matrix that has formed and is thus able subsequently to perform its catalytic action of polymerization of the reactive monomer, when the latter is released from the vessel and interacts with the epoxy matrix containing the catalyst.

DETAILED DESCRIPTION OF THE PREFERRED EMBODIMENT

In a preferred embodiment of the process of the invention, a Hoveyda-Grubbs catalyst of first generation is used in percentages in the range from 2 to 20%, and preferably from 2 to 5%, by weight relative to the polymer matrix. More preferably, the curing step envisages a first stage carried out at a temperature of 80° C. for a time of 2 to 4 hours and a second stage carried out at a temperature of 170° C. for a time of 1 to 2 hours, with at least one intermediate stage being envisaged between the first and the second stage which envisages holding at 90° C., 100° C. and 110° C. respectively for a time of at least 15 minutes at each of the aforementioned temperatures.

Examples of methods of preparation of composite materials according to the invention will now be given, purely for illustration and non-limiting.

Example 1

A mixture of the following components, in the stated amounts, is prepared in this example:

| | |
|---|---|
| DGEBA (precursor of epoxy resin, trade name EPON 828) | 70 grams |
| 1,4-Butanediol-diglycidyl ether (reactive diluent) | 17 grams |
| Dichloro(o-isopropoxyphenylmethylene)(tricyclohexylphosphine)ruthenium(II) (catalyst HG1); | 4 grams |
| 2,4,6-tris(dimethylaminomethyl)phenol (curing agent, trade name Ancamine K54) | 9 grams |
| Total | 100 grams |

The procedure adopted for preparing the aforementioned mixture is as follows. The epoxy precursor (EPON 828) was mixed mechanically with the reactive diluent at a temperature of 90° C., maintained with an oil bath, and then the catalyst HG1 in the form of crystalline powder, as supplied by the company Aldrich, was added. The catalyst was dispersed at molecular level by mechanical agitation of the mixtures maintained at 90° C. for 90 minutes.

To verify complete dispersion and dissolution of the catalyst, and that its catalytic activity remained unchanged, spectroscopic investigation was carried out.

Figure 1:
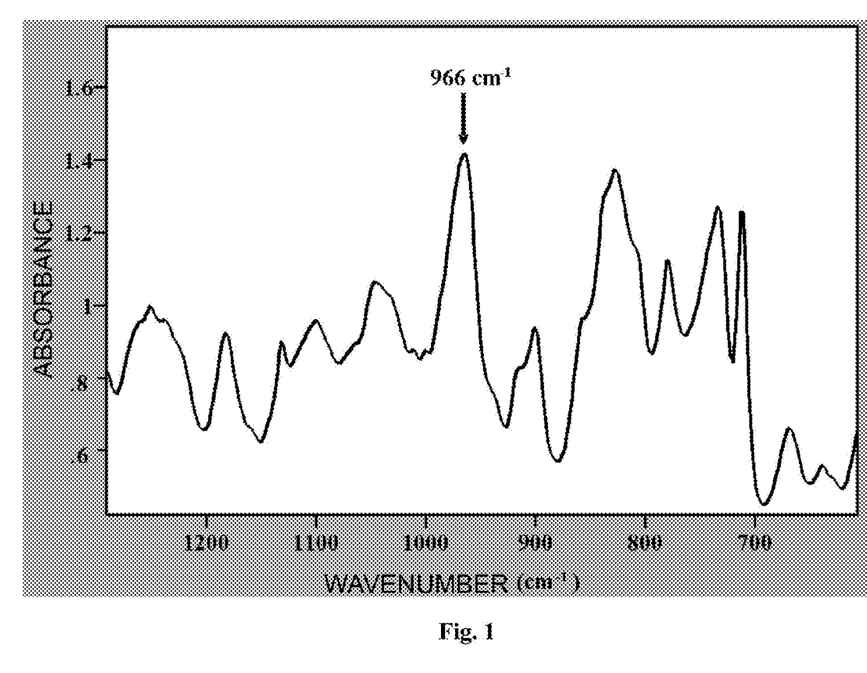
FIG. 1 shows an FT/IR spectrum of a thin solid film of metathesis product.
Figure 2:
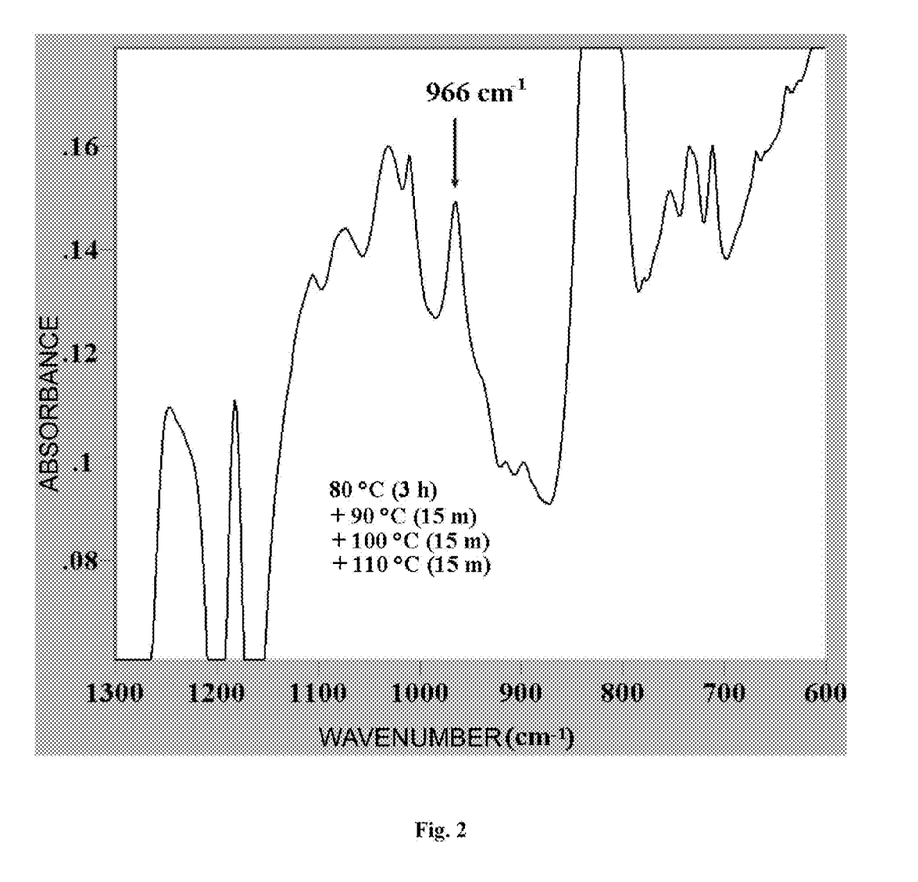
FIGS. 2-5 show FT/IR spectra of the cured material respectively after the intermediate stages, and the second stage carried out with the three variants stated above, to which ENB was then added in the same way as was done after the preliminary step of dissolution of the catalyst.
Figure 3:
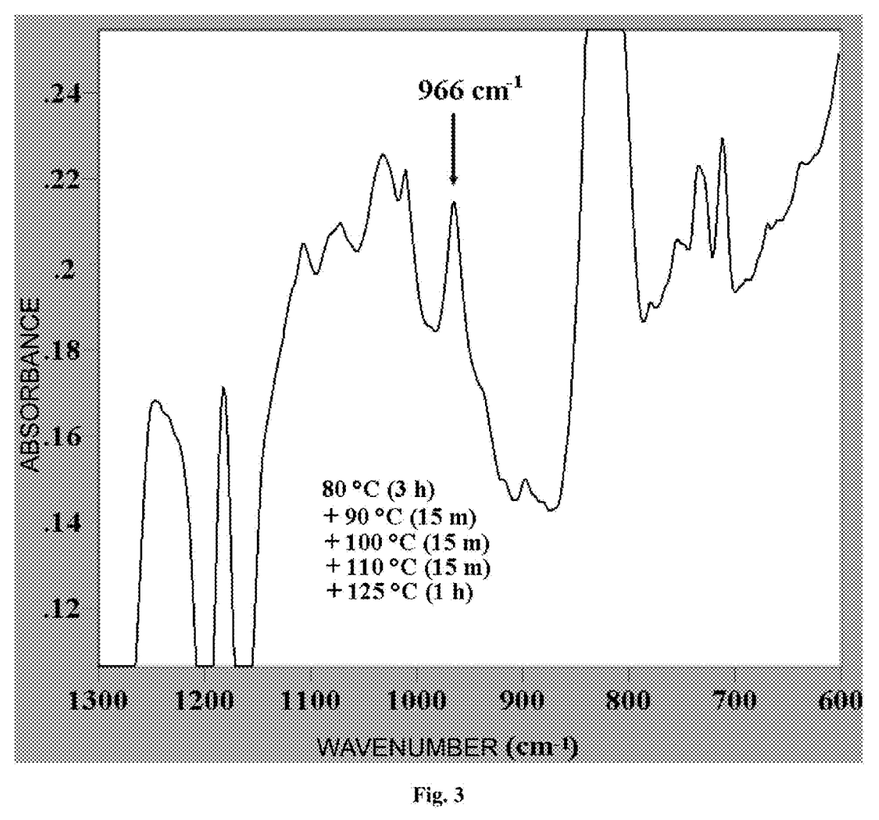
Figure 4:
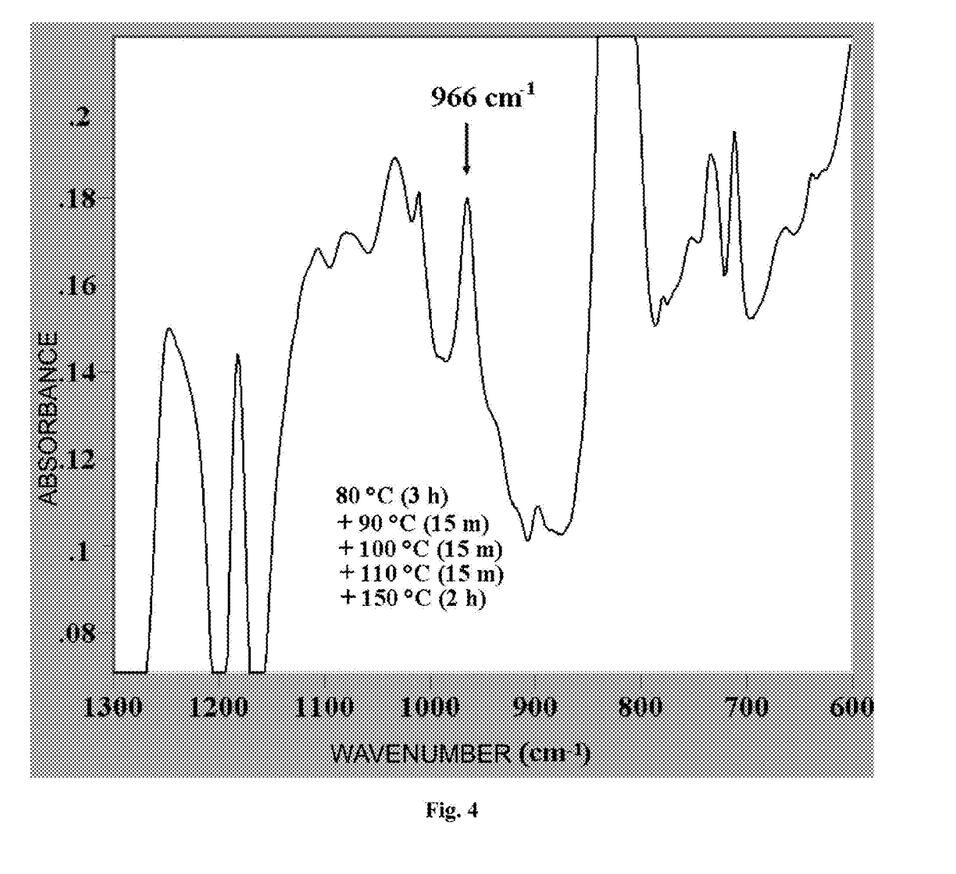
Figure 5:
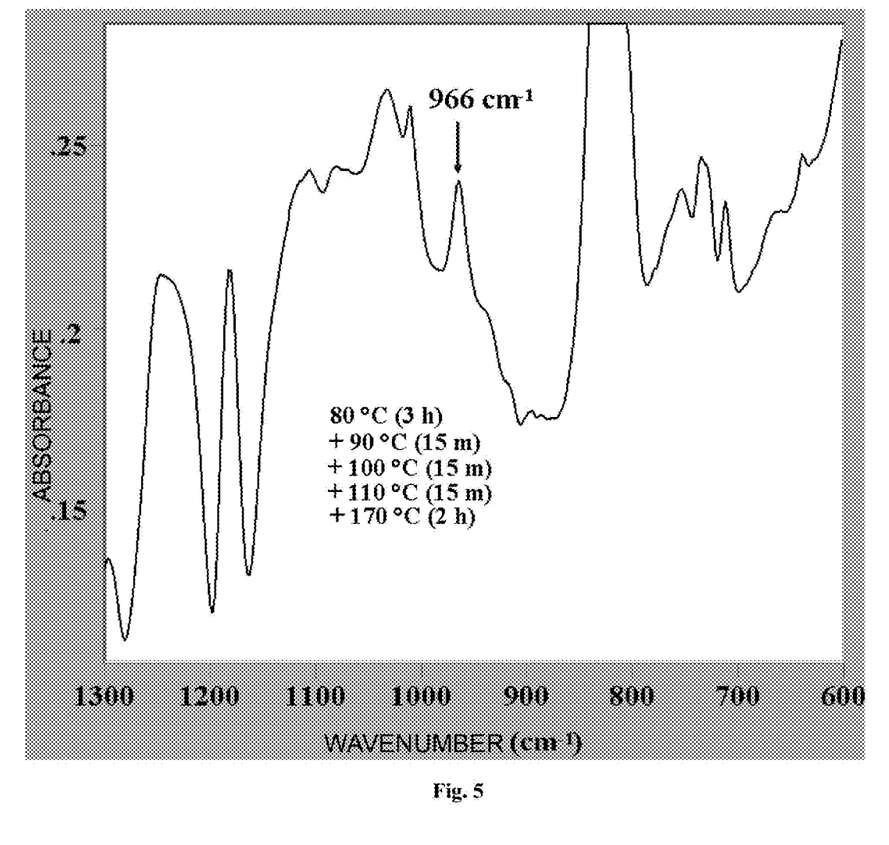

For this purpose, four drops of the mixture were deposited on a slide for light microscopy. Complete transparency, which is achieved when the catalyst is completely dissolved, can be verified by light microscopy with observation in transmission. Two drops of ENB were added to the aforesaid drops of mixtures. A thin solid film of metathesis product, whose FT/IR spectrum is shown in FIG. 1, formed immediately.

This spectrum has a peak at 966 cm$^{-1}$, which is an indication of the formation of the metathesis product and hence of the fact that the activity of the catalyst has not been compromised by the chemical nature of the oligomers, by the temperature and by the treatments of mechanical mixing.

The transparent mixture containing the completely dissolved catalyst was then taken out of the oil bath and left to cool to a temperature of 50° C., and then the curing agent was added to it.

The mixture thus obtained was cured in a two-stage process. The first stage was carried out at a temperature of 80° C. for 3 hours, while the second stage was carried out according to three variants, i.e. at the three different temperatures of 125, 150 and 170° C.

In all three cases, between the first and the second stages, three intermediate stages were always provided, each of which envisaged a holding time of 15 minutes at each of the temperatures of 90° C., 100° C. and 110° C.

FIGS. 2-5 show FT/IR spectra of the cured material respectively after the intermediate stages, and the second stage carried out with the three variants stated above, to which ENB was then added in the same way as was done after the preliminary step of dissolution of the catalyst.

The presence in all cases of the peak at 966 cm$^{-1}$, indicating formation of the metathesis product, proves that the catalytic activity of the HG1 catalyst within the epoxy matrix remained unchanged after the treatments described. It can be seen in particular from the FT/IR spectra that, after the treatment at 110° C., the mixture can be cured (cf. FIG. 5) at up to 170° C. for 2 hours without compromising the catalytic activity of the catalyst.

Naturally, if it had been necessary to prepare a self-healing material for practical use at temperatures at least as far as −55° C., the vessels containing the reactive monomer would have been added together with the curing agent in accordance with conventional procedures.

Example 2

Figure 6:
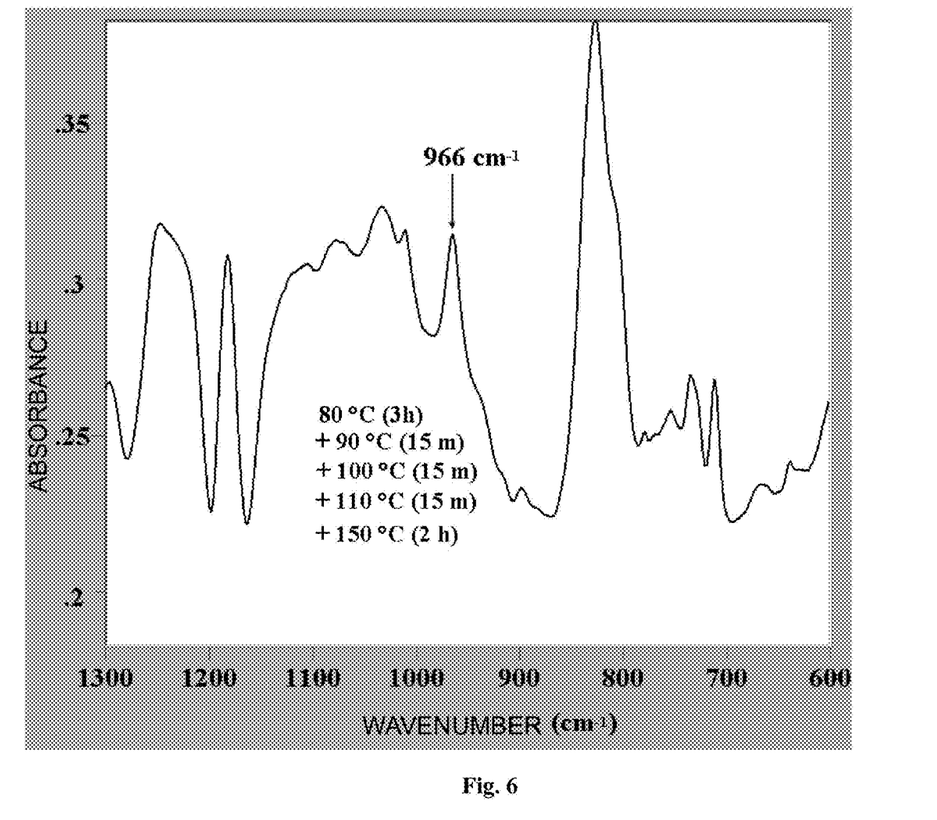
FIGS. 6-7 show the respective FT/IR spectra of example 2.
Figure 7:
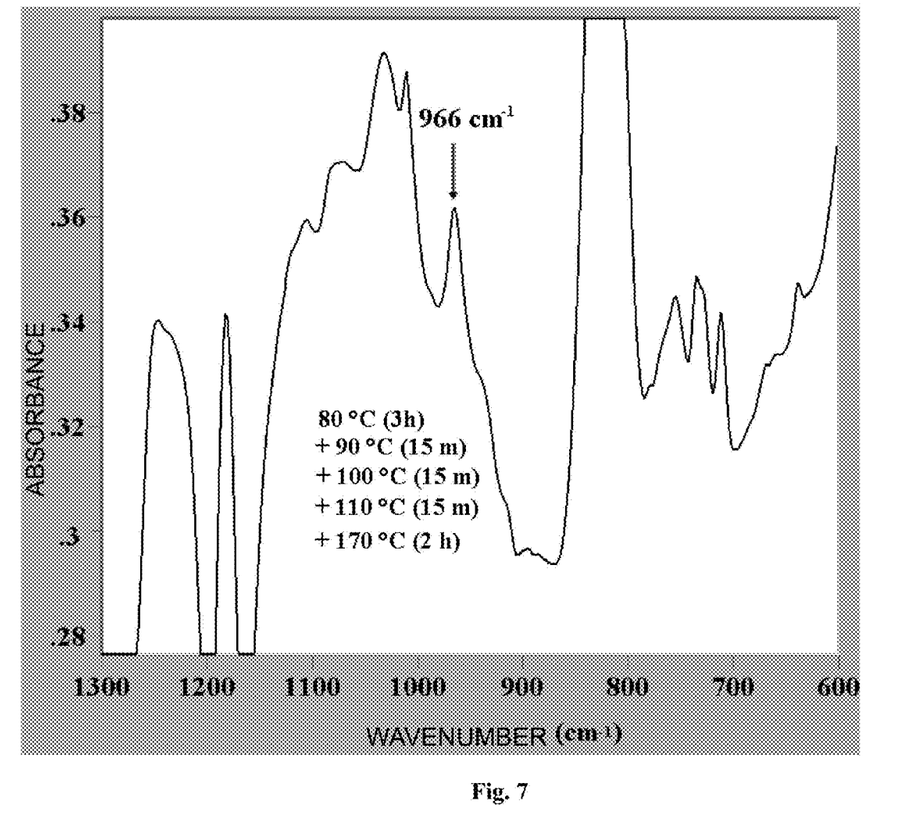

Example 2 was carried out using a procedure similar to the preceding example, except that a smaller amount of catalyst was used, equal to 3% of the total weight of the mixture. The respective FT/IR spectra (cf. FIGS. 6 and 7) do not show any decrease of the peak at 966 cm$^{-1}$, so that in this case too, the catalytic activity of the HG1 catalyst remained unchanged.

Naturally, without prejudice to the principle of the invention, the details of its execution and the embodiments can vary widely from what is described purely as examples, while remaining within the claimed scope. In particular, the dispersion of the catalyst at molecular level—i.e. the complete dissolution of all of its molecules in the mixture containing the precursor of the epoxy polymer—can be obtained by mechanical mixing or any equivalent procedure known by a person skilled in the art.

What is claimed is:

1. Process for preparing a self-healing composite material comprising a matrix of epoxy polymer, in which a catalyst of ring opening metathesis reaction and vessels containing at least one monomer able to polymerize due to a ring opening metathesis reaction are dispersed, said process comprising:
    a preliminary step of dispersing at molecular level by mechanical mixing at temperatures between 50 and 100° C. said catalyst in a mixture containing at least one precursor of said epoxy polymer having two or more epoxy rings per molecule, and then the steps of:
    dispersing in the mixture said vessels and a curing agent for said precursor, said agent being chosen from the group consisting of tertiary amines; and
    curing said mixture by at least a first heating stage performed at a temperature between 70 and 90° C. for between 1 and 5 hours, and a second heating stage performed at a temperature between 90 and 170° C. for a time-period between 2 and 3 hours.

2. Process according to claim 1, wherein the catalytic activity of the catalyst is controlled during said preliminary step of dispersing.

3. Process according to claim 1, wherein said catalyst is chosen from the group consisting of benzylidenebis(tricyclohexylphosphine) dichlororuthenium (G1); 1,3-bis-(2,4,6-trimethylphenyl)-2-(imidazolidinylidene)(dichlorophenylmethylene)(tri-cyclohexylphosphine)ruthenium (G2); dichloro(o-isopropoxyphenylmethylene)(tri-cyclohexylphosphine) ruthenium (HG1); (1,3-bis-(2,4,6-trimethylphenyl)-2-imidazolidinylide-ne)dichloro(o-isopropoxyphenylmethylene)ruthenium (HG2).

4. Process according to claim 1, wherein said precursor is chosen from the group consisting of diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4 epoxycyclohexylmethyl-3,4-epoxycyclohexane carboxylate and mixtures thereof.

5. Process according to claim 1, wherein one or more reactive diluents and/or flexibilizers in an amount between 5 and 40 parts by weight for 100 parts of precursor are added to said at least one precursor, said reactive diluents and flexibilizers being esters or ethers including an aliphatic chain comprising at least seven C atoms and at least one oxirane ring.

6. Process according to claim 1, wherein a toughening additive is added to said at least one precursor.

7. Process for preparing a self-healing composite material comprising a matrix of epoxy polymer, in which a catalyst of ring opening metathesis reaction and vessels containing at least one monomer able to polymerize due to a ring opening metathesis reaction are dispersed, said process comprising:
    a preliminary step of dispersing at molecular level said catalyst in a mixture containing at least one precursor of said epoxy polymer having two or more epoxy rings per molecule, and then the steps of:
    dispersing in the mixture said vessels and a curing agent for said precursor, said agent being chosen from the group consisting of tertiary amines; and
    curing said mixture by at least a first heating stage performed at a temperature between 70 and 90° C. for a time-period between 1 and 5 hours, and a second heating stage performed at a temperature between 90 and 170° C. for a time-period between 2 and 3 hours;
    wherein the at least one monomer contained in the vessels is a mixture of 5-ethylidene-2-norbornene (ENB) and dicyclopentadiene (DCPD) containing between 1 and 15% by weight of DCPD, based on the mixture.

8. Process for preparing a self-healing composite material comprising a matrix of epoxy polymer, in which a catalyst of ring opening metathesis reaction and vessels containing at least one monomer able to polymerize due to a ring opening metathesis reaction are dispersed, said process comprising:
    a preliminary step of dispersing at molecular level said catalyst in a mixture containing at least one precursor of said epoxy polymer having two or more epoxy rings per molecule, and then the steps of:
    dispersing in the mixture said vessels and a curing agent for said precursor, said agent being chosen from the group consisting of tertiary amines; and
    curing said mixture in stages comprising: a first stage performed at 80° C. for a time-period of 2 to 4 hours; a second stage performed at 170° C. for a time-period of 1 to 2 hours; and at least one intermediate stage performed between the first and second stages at a temperature of 90° C., 100° C. or 110° C. for a time-period of at least 15 minutes;

wherein the catalyst is an Hoveyda-Grubbs catalyst of first generation and is provided in an amount from 2% to 5% by weight relative to the polymeric matrix.

9. Process for preparing a self-healing composite material comprising a matrix of epoxy polymer, in which a catalyst of ring opening metathesis reaction and vessels containing at least one monomer able to polymerize due to a ring opening metathesis reaction are dispersed, said process comprising:
- a preliminary step of dispersing at molecular level said catalyst in a mixture containing at least one precursor of said epoxy polymer having two or more epoxy rings per molecule, and then the steps of:
- dispersing in the mixture said vessels and a curing agent for said precursor, said agent being chosen from the group consisting of tertiary amines; and
- curing said mixture by at least a first heating stage performed at a temperature between 70 and 90° C. for between 1 and 5 hours, and a second heating stage performed at a temperature between 90 and 170° C. for a time-period between 2 and 3 hours;
- wherein the polymeric matrix comprises carbon fibers and/or nanotubes in an amount comprised between 0.1 and 3.0 parts by weight for 100 parts of polymeric matrix.

* * * * *